(12) United States Patent
Zhang et al.

(10) Patent No.: US 11,503,273 B2
(45) Date of Patent: Nov. 15, 2022

(54) LIGHT FIELD DISPLAY DEVICE

(71) Applicants: BOE TECHNOLOGY GROUP CO., LTD., Beijing (CN); Beijing BOE Display Technology Co., Ltd., Beijing (CN)

(72) Inventors: Hongshu Zhang, Beijing (CN); Xiaoling Xu, Beijing (CN); Yanfeng Wang, Beijing (CN); Yun Qiu, Beijing (CN); Dan Wang, Beijing (CN)

(73) Assignees: BEIJING BOE TECHNOLOGY DEVELOPMENT CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 1204 days.

(21) Appl. No.: 15/780,323

(22) PCT Filed: Oct. 13, 2017

(86) PCT No.: PCT/CN2017/105991
§ 371 (c)(1),
(2) Date: May 31, 2018

(87) PCT Pub. No.: WO2018/166194
PCT Pub. Date: Sep. 20, 2018

(65) Prior Publication Data
US 2021/0168350 A1    Jun. 3, 2021

(30) Foreign Application Priority Data

Mar. 17, 2017    (CN) .......................... 201710162118.8

(51) Int. Cl.
*H04N 13/322*    (2018.01)
*H04N 13/346*    (2018.01)
(Continued)

(52) U.S. Cl.
CPC ......... *H04N 13/322* (2018.05); *G02B 27/144* (2013.01); *G02B 27/283* (2013.01);
(Continued)

(58) Field of Classification Search
USPC .......................................................... 348/58
See application file for complete search history.

(56) References Cited

U.S. PATENT DOCUMENTS

| 7,986,374 B2 | 7/2011 | Ijzerman et al. |
| 9,423,626 B2 | 8/2016 | Choi et al. |
| (Continued) | | |

FOREIGN PATENT DOCUMENTS

| CN | 101395928 A | 3/2009 |
| CN | 105204174 A | 12/2015 |
| (Continued) | | |

OTHER PUBLICATIONS

International Search Report for PCT/CN2017/105991 dated Jan. 12, 2018.

*Primary Examiner* — Mikhail Itskovich
(74) *Attorney, Agent, or Firm* — Calfee, Halter & Griswold LLP

(57) ABSTRACT

The present disclosure provides a light field display device. The light field display device includes a plurality of imaging modules. Each of the imaging modules includes a liquid crystal lens array and a display screen, the liquid crystal lens array is disposed on a light exit side of the display screen, and images of the plurality of imaging modules are parallel to each other.

20 Claims, 4 Drawing Sheets

(51) Int. Cl.
*G02B 30/10* (2020.01)
*G02B 27/14* (2006.01)
*G02F 1/29* (2006.01)
*G02B 27/28* (2006.01)

(52) U.S. Cl.
CPC ............. *G02B 30/10* (2020.01); *G02F 1/294* (2021.01); *H04N 13/346* (2018.05)

(56) References Cited

U.S. PATENT DOCUMENTS

| | | |
|---|---|---|
| 2009/0033812 A1 | 2/2009 | Ijzerman et al. |
| 2012/0307357 A1 | 12/2012 | Choi et al. |
| 2017/0078652 A1* | 3/2017 | Hua ................. H04N 13/31 |
| 2017/0269366 A1* | 9/2017 | Lee .................. G02B 27/0172 |

FOREIGN PATENT DOCUMENTS

| | | |
|---|---|---|
| CN | 105911708 A | 8/2016 |
| CN | 205787364 U | 12/2016 |
| CN | 106647094 A | 5/2017 |
| EP | 1994767 A1 | 11/2008 |
| EP | 1994767 B1 | 2/2011 |
| WO | 2007099488 A1 | 9/2007 |

\* cited by examiner

LIGHT FIELD DISPLAY DEVICE

CROSS-REFERENCE TO RELATED APPLICATIONS

This application is based upon and claims priority to International Application No. PCT/CN2017/105991, filed on Oct. 13, 2017, which is based on and claims priority to Chinese Patent Application 201710162118.8, filed Mar. 17, 2017, the entire contents of which are incorporated herein by reference.

TECHNICAL FIELD

The present disclosure relates to the technical field of light field display, and in particular, to a light field display device.

BACKGROUND

The light field display technology is a technology for reproducing the original object by recording the three-dimensional position information of the object information in the propagation process. The light display technology has one more degree of freedom than conventional two-dimensional imaging methods, and thus can acquire richer image information. At present, due to the realism and depth information brought by 3D display, more and more people have studied the light field technology which in turn enriches our lives. The real three-dimensional display of space means that an observer can observe objects as the objects are in real scene without need of using any tool. Around the three-dimensional display, the observer can see the three-dimensional information on all sides of the object. Combining the advantages of three-dimensional display and light field technology, a 3D light field display technology has emerged.

The 3D light field display technology is divided into two stages: a recording stage and a reproduction stage. In the three-dimensional data recording stage, three-dimensional information of an object is collected by a CCD (Charge Coupled Device) through a plurality of micro-lenses. The plurality of micro-lenses consist of many identical small lenses. These lenses are called unit lenses. The image array recorded by these unit lenses is a unit image. The unit image is recorded and stored by the CCD. In the three-dimensional information display stage, the unit image array is displayed on a spatial light modulator or on a Liquid Crystal Display (LCD). The light emitted by the unit images is superimposed in the space through the micro lenses to reproduce the light field of the original object, and then the three-dimensional image of the original object can be seen.

It should be noted that the information disclosed in the foregoing background section is only for enhancement of understanding of the background of the present disclosure and therefore may include information that does not constitute prior art that is already known to those of ordinary skill in the art.

SUMMARY

According to an aspect of the present disclosure, there is provided a light field display device. The light field display device includes a plurality of imaging modules, each of the imaging modules includes a liquid crystal lens array and a display screen, the liquid crystal lens array is disposed on a light exit side of the display screen, and images of the plurality of imaging modules are parallel to each other.

According to an exemplary embodiment of the present disclosure, the plurality of imaging modules include a first imaging module and a second imaging module which are disposed in parallel.

According to an exemplary embodiment of the present disclosure, the plurality of imaging modules include a first imaging module and a second imaging module which are disposed in a preset angle.

According to an exemplary embodiment of the present disclosure, the light field device further includes a transflective film, wherein:

the transflective film is used to make images of the first imaging module and images of the second imaging module parallel to each other.

According to an exemplary embodiment of the present disclosure, the first imaging module and the second imaging module are vertically disposed, and the transflective film forms an angle of 45 degrees with the first imaging module and the second imaging module.

According to an exemplary embodiment of the present disclosure, images of the first imaging module are formed before or after images of the second imaging module.

According to an exemplary embodiment of the present disclosure, the light field display device further includes a Polarization Beam Splitter (PBS) prism, wherein:

the PBS polarization beam splitter prism is used to make images of the first imaging module and images of the second imaging module parallel to each other.

According to an exemplary embodiment of the present disclosure, a first liquid crystal lens array of the first imaging module and a second liquid crystal lens array of the second imaging module have equal number of focal lengths.

According to an exemplary embodiment of the present disclosure, the number of focal lengths of a first liquid crystal lens array of the first imaging module is related to display performance of a first display screen of the first imaging module, the number of focal lengths of a second liquid crystal lens array of the second imaging module is related to display performance of second first display screen of the second imaging module, and the number of the focal lengths of the first liquid crystal lens array and the number of the second liquid crystal lens array is related to the number of depths of field of images to be displayed.

According to an exemplary embodiment of the present disclosure, the liquid crystal lens array has a plurality of focal lengths which are equidifferent.

It should be understood that the above general description and the following detailed description are merely exemplary and are not intended to limit the present disclosure.

BRIEF DESCRIPTION OF THE DRAWINGS

The accompanying drawings, which are incorporated in and constitute a part of this specification, illustrate embodiments consistent with the present disclosure, and together with the description serve to explain the principles of the disclosure. Obviously, the drawings in the following description are merely some embodiments of the present disclosure, and those skilled in the art can also obtain other drawings based on these drawings without any creative work.

DETAILED DESCRIPTION

Figure 1:
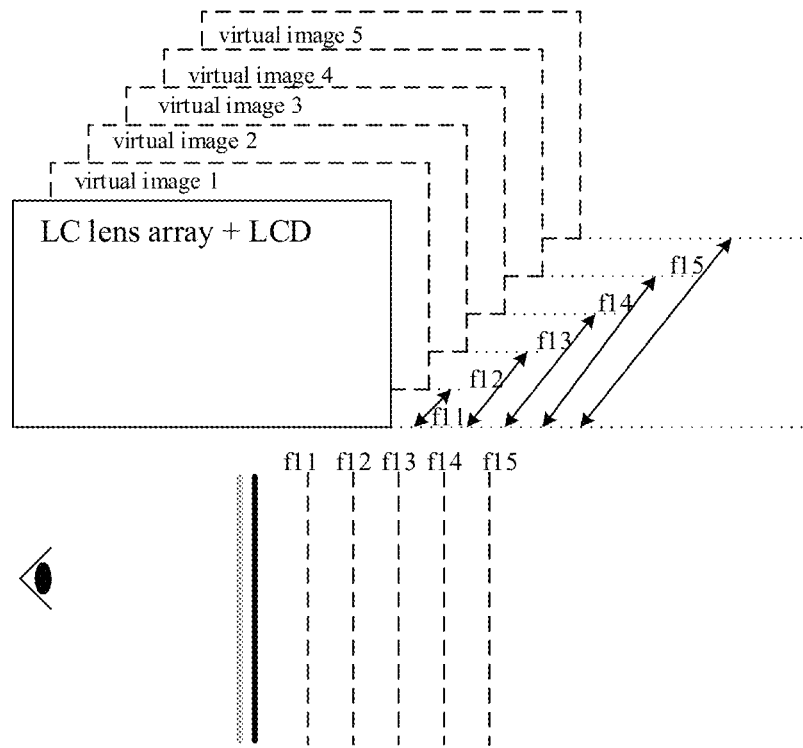
FIG. 1 is a schematic diagram showing a light display in related arts.

Example embodiments will now be described more fully with reference to the accompanying drawings. However, example embodiments can be implemented in various forms and should not be construed as limited to the examples set forth herein; the described features, structures, or characteristics may be combined in any suitable manner in one or more embodiments. In the following description, numerous specific details are provided to provide a thorough understanding of the embodiments of the present disclosure. However, those skilled in the art will recognize that the technical solutions of the present disclosure may be practiced by omitting one or more of the specific details, or that other methods, components, devices, steps, etc. may be employed.

It should be noted that in the drawings, the dimensions of layers and regions may be exaggerated for clarity of illustration. It will also be understood that when an element or layer is referred to as being "on" another element or layer, it can be directly on the other element or intervening layers may be present. In addition, it will be understood that when an element or layer is referred to as being "under" another element or layer, it can be directly under the another element, and there may be more than one intervening layer or element. In addition, it will also be understood that when a layer or element is referred to as being "between" two layers or two elements, it can be the only layer between two layers or two elements, or more than one intervening layer or element can also be present. Like reference numerals refer to like elements throughout the drawings.

An embodiment of the present disclosure firstly provides a light field display device. The light field display device may include a plurality of imaging modules. Each of the imaging modules includes a Liquid Crystal lens array (hereinafter referred to as LC lens). Array) and a display screen. The liquid crystal lens array can be disposed on the light exit side of the display screen. Images of the plurality of imaging modules are parallel to each other. The plurality of imaging modules can reduce the refresh frequency requirement of the display screen and the liquid crystal lens array, thereby reducing the response time requirement.

In an exemplary embodiment, the display screen may include any display screen such as a liquid crystal display (LCD), an organic light-emitting diode (OLED) display, and the like, and the present disclosure does not impose specifications on this. In the following embodiments, a liquid crystal display (LCD) is used as an example for illustration, but it is not intended to limit the disclosure.

For the purpose of 3D display, a liquid crystal lens may be provided in the display device. The liquid crystal lens includes a plurality of liquid crystal repeating units. Each liquid crystal repeating unit is equivalent to a cylindrical lens. When light that presents the same screen passes through the liquid crystal lenses, each liquid crystal repeating unit focuses the light in a different direction, so that the light which enters user's left and right eyes are different.

Specifically, the liquid crystal lens includes an upper substrate and a lower substrate disposed opposite to each other, and a liquid crystal layer filled between the upper substrate and the lower substrate. An upper electrode is disposed on the upper substrate, and a plurality of parallel strip electrodes are disposed on the lower substrate. When the stripe electrodes are charged to form an electric field between the upper electrode and each stripe electrode, the tilt angle of the liquid crystal molecules in the liquid crystal layer near the lower substrate is gradually decreased from the center region to the edge region in each liquid crystal repeating unit. In this way, the refractive index of the liquid crystal layer close to the lower substrate is gradually decreased from the central area to the edge area. The change of the refractive index causes the light to be focused to a predetermined direction when passing through the liquid crystal layer close to the lower substrate, and the 3D display can be realized by the optical action of the plurality of liquid crystal repeating units in the liquid crystal lens.

The liquid crystal lens array in the embodiment of the present disclosure, on the one hand, can replace the original cylindrical lens type product. An advantage is that the LCD screen can freely switch between the 2D and the 3D effects, and users do not need to wear glasses when watching images, thereby getting rid of the inconvenience of wearing glasses. At the same time, this technical solution maintains a high-detailed, realistic three-dimensional image quality. On the other hand, LC lens technology breaks through the distance limitations of naked-eye 3D displays. The traditional naked-eye 3D have the limitation of viewing at a fixed distance, but through the technology of the LC lens, the distance generated by the 3D image can be adjusted so that users can freely select a proper distance to watch images.

In an exemplary embodiment, the liquid crystal lens array may achieve a fast zoom by adjusting a magnitude of a driving voltage.

The liquid crystal lens array in the embodiment of the present disclosure may have a structure selected from any of a curved electrode, a hole type electrode, a polymer structure or the like. The curved electrode may include a curved box and a flat box. The hole type electrode may include two types, such as built-in electrode, and external electrodes. In the present disclosure, any liquid crystal lens in related arts can be selected, and the present disclosure does not impose specific limitations on this.

FIG. 1 shows a schematic diagram of a light field display in related arts.

The light field display scheme in related arts is as follows. An LC lens array is added onto a liquid crystal display (LCD), and the imaging position on the liquid crystal display is changed by adjusting the focal length of the liquid crystal lens array. When the refresh rate of the liquid crystal lens array and the liquid crystal display is very high, and the focal length of the liquid crystal lens matches the images of the liquid crystal display, images with different depths of field can be displayed "simultaneously".

Referring to FIG. 1, there is an LC lens array and an LCD. To display an image with six depths of field, the light field display scheme requires the LC lens array to have 5 focal lengths, such as f11, f12, f13, f14, and f15 in FIG. 1. Five virtual images are respectively generated at the five focal lengths, i.e., the virtual image 1, the virtual image 2, the virtual image 3, the virtual image 4, and the virtual image 5.

Assuming that the refresh rate of an ordinary display is 60 Hz, the original one frame needs to be divided into 6 frames, i.e., a refresh rate of 60 Hz*6=360 Hz is needed, and then both the LC lens array and the LCD require a refresh rate of 360 Hz, and the response time requirement is <2.7 ms. This is very difficult to realize for existing liquid crystals.

In the following descriptions, all of the embodiments are described with reference to the embodiment of FIG. 1 described above, but the disclosure is not limited thereto. In the embodiments of FIGS. 2 to 7, for example, the light field displays images with six depths of field; however, the images actually displayed by the light field may have any depth of field, and the present disclosure does not impose specific limitations on this.

In an exemplary embodiment, the plurality of imaging modules may include a first imaging module and a second imaging module. The first imaging module (for example, a combination 1 composed including an LC lens array and a LCD) and the second imaging module (for example, a combination 1 composed including an LC lens array and a LCD) can be disposed in parallel. The light field display device is described below with reference to FIG. 2.

Figure 2:
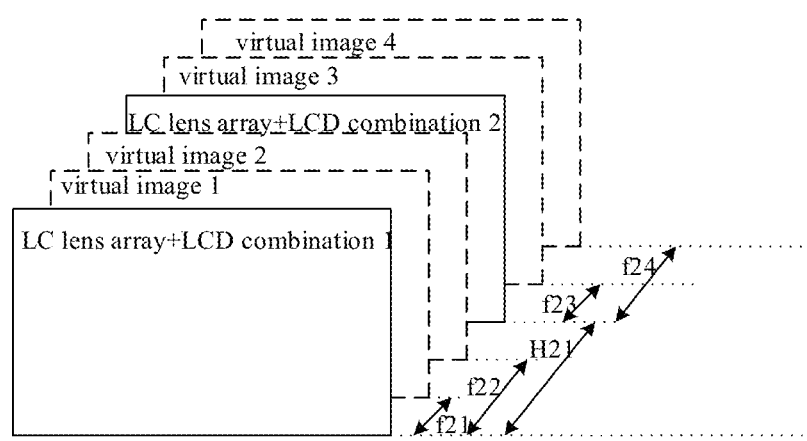
FIG. 2 is a schematic diagram showing a light field display device according to an exemplary embodiment of the present disclosure.

FIG. 2 shows a schematic diagram of a light field display device according to an exemplary embodiment of the present disclosure.

As shown in FIG. 2, the light field display device includes an LC lens array and LCD combination 1, and an LC lens array and LCD combination 2. The principle of the 3D display is as follows. The LC lens array with variable focal length is placed in front of the LCD. In the "1 frame" time, the LCD screen and the focal length of and the LC lens array are adjusted so that different images and focal lengths are displayed at ⅙, ⅖, ⅜, ⅘, ⅝, ⅚ frames, and thereby images with vertical depths of field are formed. The human eye can focus any depth of field to observe the images and create a three-dimensional effect.

In the embodiment of FIG. 2, the LC lens array in the LC lens array and the LCD combination 1 has two focal lengths, i.e., f21 and f22, so that two virtual images (a virtual image 1 and a virtual image 2) can be generated at corresponding positions. Here, it is assumed that the virtual image 1 and the virtual image 2 in FIG. 2 correspond to the positions of the virtual image 1 and the virtual image 2 in FIG. 1, respectively; however, the present disclosure is not limited to this. The LC lens array in the LC lens array and the LCD combination 2 also has two focal lengths, i.e., f23 and f24, so that two virtual images (a virtual image 3 and a virtual image 4) can be generated at corresponding positions. Here, it is assumed that the virtual image 3 and the virtual image 4 in FIG. 2 correspond to the positions of the virtual image 4 and the virtual image 5 in FIG. 1; however, the present disclosure is not limited to this. The distance between the LC lens array and the LCD combination 1 and the LC lens array and the LCD combination 1 is H21.

In the light field display scheme shown in FIG. 1, the five focal lengths of the LC lens array can be adjusted to have an equidifferent distribution, for example, f11=f12−f11=f13−f12=f14−f13=f15−f14. Corresponding to this, in the embodiment shown in Fig., H21 may be adjusted to make H21=f13, that is, the LC lens array and LCD combination 2 is at the position of the virtual image 3 shown in FIG. 1, but the present disclosure is not limited to this. In other embodiments, the multiple focal lengths of the liquid crystal lens array may do not have an equidifferent distribution. The adjustment of the focal length is related to the actual content of the currently captured image, and number of the depths of field of the image cannot exceed the upper limit of the display performance (for example, the number of the depths of field may be 6 depths of field or less).

In the embodiment shown in FIG. 2, it is also possible to adjust the focal lengths of the LC lens array in the LCD lens array and LCD combination 1 and the LC lens array and LCD combination 2 so that f21=f23=f11, f22=f24=f12, f22=2*f21, and f24=2*f23, but the present disclosure is not limited to this. In other embodiments, it is also possible to adjust the focal lengths of the LC lens array in the LCD lens array and LCD combination 1 and the LC lens array and LCD combination 2 so that f21≠f23≠f11, f22≠f24≠f12, f22≠2*f21, f24≠2*f23.

After the entire display is completed, a fixed distance H21 may be set between the combination 1 and the combination 2, but the specific distance value is related to the focal length range of the liquid crystal lens array, the depth of field of the captured image, and the like.

In the embodiment shown in FIG. 2, two combinations, i.e., the LC lens array and LCD combination 1 and the LC lens array and LCD combination 2, are used. If images with six depths of field are displayed, each of the LC lens array and LCD combination 1and the LC lens array and LCD combination 2 only needs to have two focal lengths, and if 60 Hz light field image needs to be displayed, a refresh rate of 60 Hz*3=180 Hz is required, and response time requirement is <5.5 ms, and all these requirements are very easy to achieve for the existing liquid crystal, and response time requirement is reduced by 50%.

In the embodiment shown in FIG. 2, the first liquid crystal array of the first imaging module (e.g., the LC lens array and LCD combination 1) and the second liquid crystal array of the second imaging module (e.g., the LC lens array and LCD combination 2) have the same number of focal lengths. For example, the LC lens array and LCD combination 1 has two focal lengths (f21 and f22) and two virtual images (virtual image 1 and virtual image 2) can be generated; meanwhile, for example, the LC lens array and LCD combination 2 also have two focal lengths (f23 and f24), and two virtual images (virtual image 3 and virtual image 4) can be generated.

However, the present disclosure is not limited to this. In other exemplary embodiments, the number of focal lengths of the first liquid crystal lens array of the first imaging module and the number of focal lengths of the second liquid crystal lens array of the second imaging module may be different. The embodiments as shown in FIG. 3 will be described below.

Figure 3:
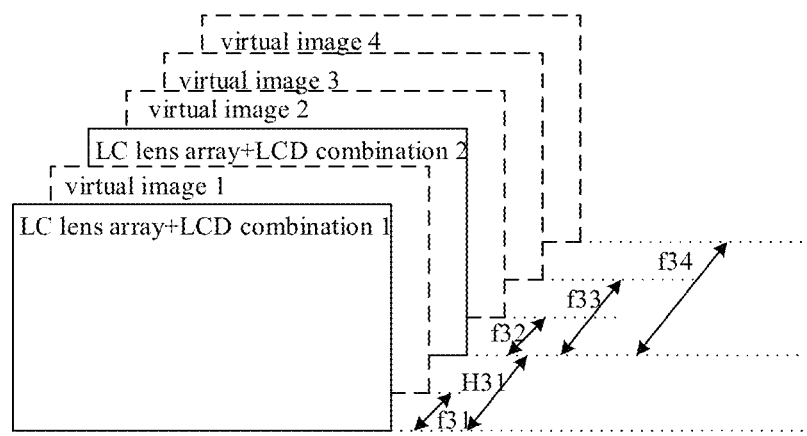
FIG. 3 is a schematic diagram showing a light field display device according to an exemplary embodiment of the present disclosure.

FIG. 3 shows a schematic diagram of a light field display device according to an exemplary embodiment of the present disclosure.

As shown in FIG. 3, the light field display device includes an LC lens array and LCD combination 1 and an LC lens array and LCD combination 2. The LC lens array in the LC lens array and LCD combination 1 has a focal length f31, and a virtual image 1 is generated at a corresponding position. The LC lens array of the LC lens array and an LCD combination 2 has three focal lengths, i.e., f32, f33, and f34, and a virtual image 2, a virtual image 3, and a virtual image 4 are generated at corresponding positions.

The LC lens array and LCD combination 2 may be disposed at the position of the virtual image 2 in FIG. 1, and the generated virtual image 2, virtual image 3, and virtual image 4 may correspond to the positions of the virtual image 3, the virtual image 4 and the virtual image 5 in FIG. 1, and the distance between the LC lens array and LCD combination 1 and the LC lens array and LCD combination 2 is H31, i.e., H31=f12. However, the present disclosure is not limited to this.

In the embodiment shown in FIG. 3, it is assumed that f31=f11=f32, f33=f12, and f34=f13, that is, f32, f33, and f34 are equidifferent, but the present disclosure is not limited to this.

In the embodiment of FIG. 3, the LC lens array and LCD combination 1 has a focal length (f31), and a virtual image (virtual image 1) can be generated; the LC lens array and LCD combination 2 has three focal lengths (f32, f33, and f34), and three virtual images (the virtual image 2, the virtual image 3, and the virtual image 4) can be generated. Two combinations, i.e., the LC lens array and LCD combination 1 and the LC lens array and LCD combination 2, are used. If images with six depths of field are displayed, the LC lens array and LCD combination 1 only needs to have one focal length, and if 60 Hz light field image needs to be displayed, a refresh rate of 60 Hz*2=120 Hz is required; he LC lens array and LCD combination 2 needs to have three focal lengths, and if 60 Hz light field image needs to be displayed, a refresh rate of 60 Hz*4=240 Hz is required.

In other exemplary embodiments, the LC lens array and LCD combination 2 may also be disposed at the virtual image 4 in FIG. 1; and at this time, the LC lens array and LCD combination 1 generate the virtual image 1 and the virtual image 2 and the virtual image 3; and the LC lens array and LCD combination 2 generates a virtual image 4. At this time, the LC lens array and LCD combination 1 has three focal lengths and can form three virtual images; and the LC lens array and LCD combination 2 has one focal length and can form one virtual image.

As can be known from the above embodiments, in the embodiment of the present disclosure, the number of focal lengths of the first liquid crystal lens array of the first imaging module is related to the display performance (e.g., the refresh rate or the response time) of the first display screen of the first imaging module. Similarly, the number of focal lengths of the second liquid crystal lens array of the second imaging module is related to the display performance of the second display screen of the second imaging module. In addition, the sum of the focal lengths of the first liquid crystal lens array and the second liquid crystal lens array also depends on the upper limit of the depths of field of the images to be displayed. For example, if an image with six depths of field is to be displayed, the sum of the focal lengths of the first liquid crystal lens array and the second liquid crystal lens array is greater to or equal to four.

In an exemplary embodiment, the plurality of imaging module may include a first imaging module, a second imaging module, and a third imaging module. The first imaging module (e.g., the LC lens array and LCD combination 1), the second imaging module (e.g., the LC lens array and LCD combination 2) and the third imaging module (e.g., the LC lens array and LCD combination) 3) can be disposed in parallel. Examples will be described with reference to FIG. 4.

Figure 4:
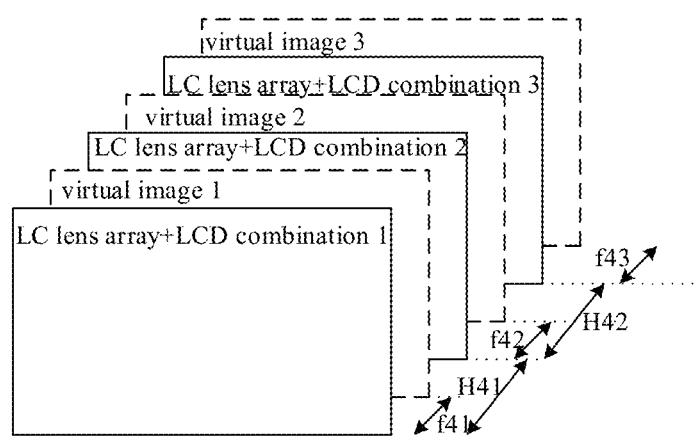
FIG. 4 is a schematic diagram showing a light field display device according to an exemplary embodiment of the present disclosure.

FIG. 4 is a schematic diagram of a light field display device according to an exemplary embodiment of the present disclosure.

As shown in FIG. 4, the light field display device includes: an LC lens array and LCD combination 1 having a focal length f41 and capable of generating a virtual image 1 at a corresponding position; an LC lens array and LCD combination 2 having a focal length f42 and capable of generating a virtual image 2 at a corresponding position; and an LC lens array and LCD combination 3 having a focal length f43 and capable of generating a virtual image 3 at a corresponding position.

The LC lens array and LCD combination 1 can be disposed at the position of the virtual image 2 in FIG. 1, that is, the distance between the LC lens array and LCD combination 1 and the LC lens array and LCD combination 2 is H41=f12. The LC lens array and LCD combination 3 may be disposed at the virtual image 4 in FIG. 1, that is, the distance between the LC lens array and LCD combination 2 and the LC lens array and LCD combination 3 is H42=f12. However, the present disclosure is not limited to this.

With continued reference to FIG. 4, the focal lengths of the liquid crystal lens arrays of the LC lens array and LCD combination 1, the LC lens array and LCD combination 2 and the LC lens array and LCD combination 3 may be adjusted such that f41=f42=f43, but the present disclosure is not limited to this.

In the embodiment of FIG. 4, the light field display device uses three LC lens array+LCD combinations and causes the LC lens array+LCD combination 2 to be in the position of the second virtual image in FIG. 1 and the LC lens array+LCD combination 3 to be in the position of the fourth virtual image in FIG. 1. Assuming that 6 depths of field are to be achieved, it is required that the LC lens array of each of combination 1, combination 2, and combination 3 needs only one focal length, and the refresh rate of the 60 Hz light field images needs to be 60 Hz*2=120 Hz, and the response time requirement is <8.3 ms.

In other embodiments, the combination 2 and combination 3 may actually be located at any one of the first to fifth virtual images in FIG. 1.

It should be noted that, although the embodiments in FIGS. 2 to 4 provide examples of two or three imaging modules, in practice, the light field display device may have arbitrary number of imaging modules (e.g., more than two imaging modules). The number of specific imaging modules can be reasonably selected based on the upper limit of the number of depths of field of the images to be displayed in the actual application scene and the refresh rate of the display screen and the liquid crystal lens array. For example, when the displayed image includes images of eight depths of field, two imaging modules, three imaging modules, or four imaging modules may be selected, and the position of each imaging module may also be flexibly configured according to the response time requirement. The present disclosure is not limited to this.

In an exemplary embodiment, the plurality of imaging modules may include a first imaging module and a second imaging module. There may be a preset angle between the first imaging module (for example, the LC lens array and LCD combination 1) and the second imaging module (for example, the LC lens array and LCD combination 2).

In an exemplary embodiment, the light field display device may further include a transflective film.

The transflective film can be used to make the images of the first imaging module (e.g., the LC lens array and LCD combination 1) and the images of the second imaging module (e.g., the LC lens array and LCD combination 2) parallel to each other.

In an exemplary embodiment, the light field display device may further include a Polarization Beam Splitter (PBS) prism. That is, the transflective film can be replaced with the PBS prism, and the polarizer directions of the display screen of the first imaging module and the display screen of the second imaging module are adjusted to output the P wave and the S wave.

The PBS prism can be used to make the images of the first imaging module (e.g., the LC lens array and LCD combination 1) and the images of the second imaging module (e.g., the LC lens array and LCD combination 2) to be parallel to each other.

The PBS prism can separate the incident non-polarized light into two vertical linearly polarized light, wherein the P polarized light passes completely, and the S polarized light is reflected at an angle of 45 degrees, and the exit direction of the S polarized light forms a 90 degree angle with the P polarized light. The PBS prism is formed by adhering a pair of high-precision right angle prisms, and a polarizing beam-splitting medium film is plated on the oblique side of one prism.

In an exemplary embodiment, the preset angle may be 90 degrees, i.e., the first imaging module (e.g., the LC lens array and LCD combination 1) and the second imaging module (e.g., the LC lens array and LCD combination). 2) are disposed perpendicular to each other. This is illustrated by FIG. 5 below.

Figure 5:
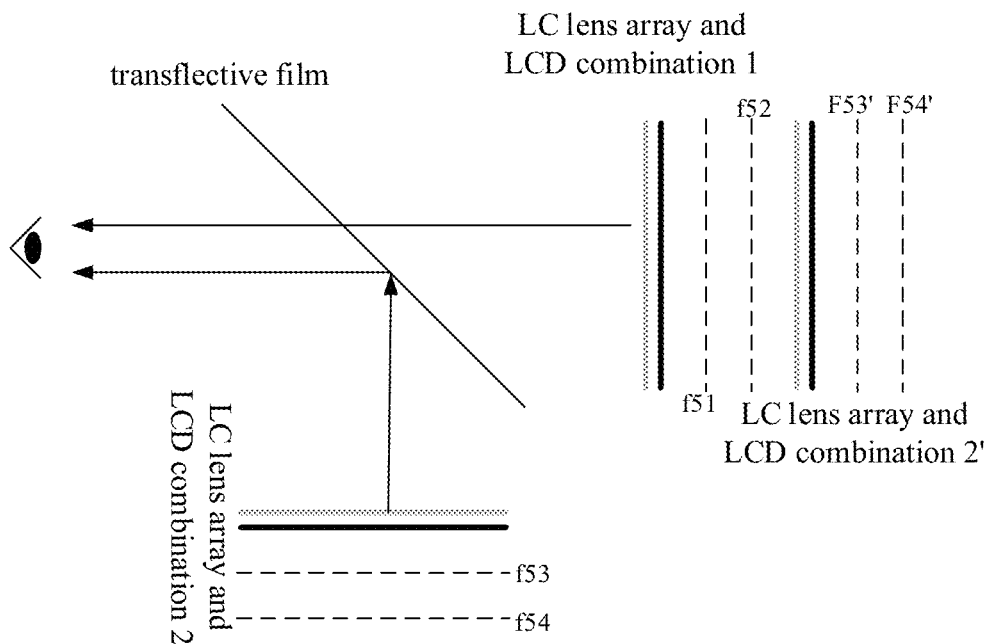
FIG. 5 is a schematic diagram showing a light field display device according to an exemplary embodiment of the present disclosure.

FIG. 5 is a schematic diagram of a light field display device according to an exemplary embodiment of the present disclosure.

As shown in FIG. 5, the light field display device may include: an LC lens array and LCD combination 1, wherein focal lengths of two virtual images are f51 and f52, and it is assumed that f52=2*f51; and an LC lens array and LCD combination 2, wherein focal lengths of two virtual images are f53 and f54, and it is assumed that f54=2*f53=f52=2*f51.

In the embodiment shown in FIG. 5, the LC lens array and LCD combination 1 and the LC lens array and LCD combination 2 are placed perpendicular to each other. The light field display also has a transflective film that forms a 45-degree angle with the LC lens array and LCD combination 1 and the LC lens array and LCD combination 2, respectively. By adjusting the distance between the LC lens array and LCD combination 1 and the LC lens array and LCD combination 2, the transflective film can be used to make images of the LC lens array and LCD combination 2 after the images of the LC lens array and LCD combination 1.

Figure 6:
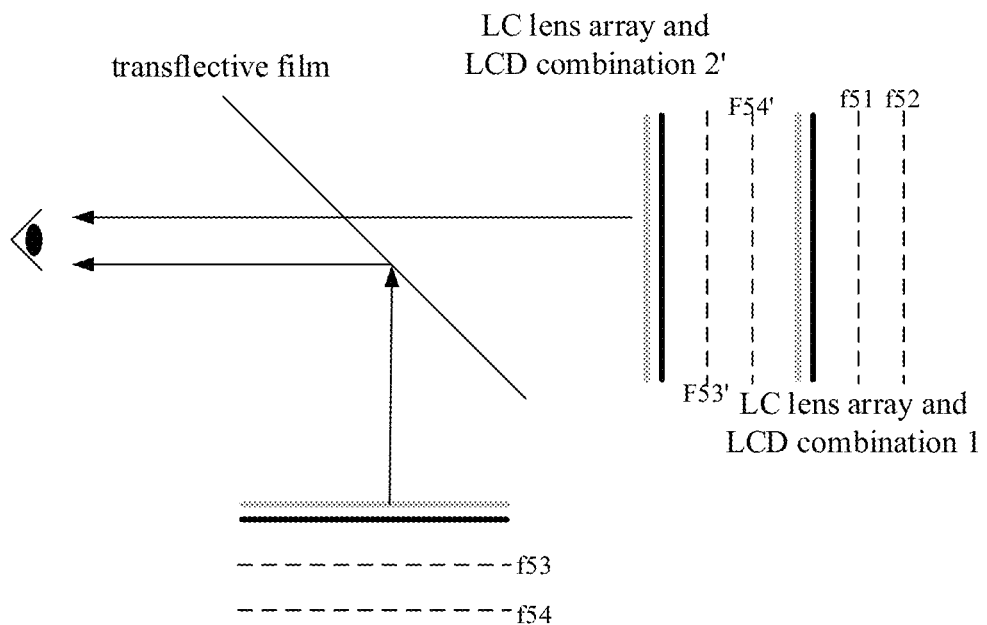
FIG. 6 is a schematic diagram showing a light field display device according to an exemplary embodiment of the present disclosure.

FIG. 6 is a schematic diagram of a light field display device according to an exemplary embodiment of the present disclosure.

The difference between FIGS. 6 and 5 is that by adjusting the distance between the LC lens array and LCD combination 1 and the LC lens array and LCD combination 2, the transflective film can be used to make images of the LC lens array and LCD combination 2 before the images of the LC lens array and LCD combination 1.

In other embodiments, by setting the transflective film and adjusting the distance between the LC lens array and LCD combination 1 and the LC lens array and LCD combination 2, the images of the LC lens array and LCD combination 2 can be before or after the images of the LC lens array and LCD combination 1

Figure 7:
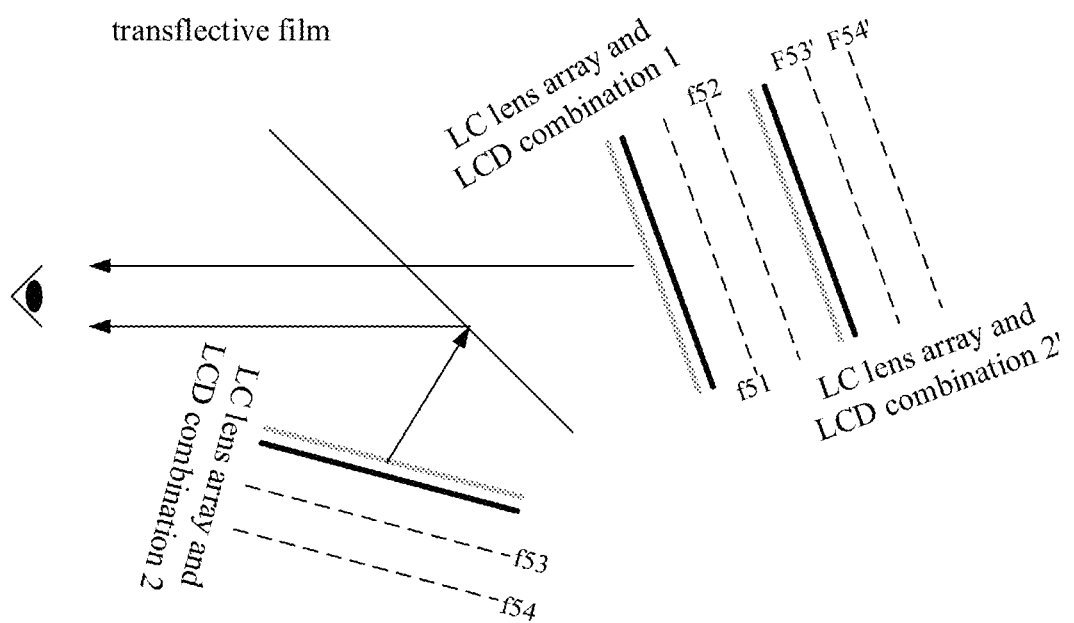
FIG. 7 is a schematic diagram showing a light field display device according to an exemplary embodiment of the present disclosure.

FIG. 7 is a schematic diagram of a light field display device according to an exemplary embodiment of the present disclosure.

The difference between FIGS. 7 and 5 is that the LC lens array and LCD combination 1 and the LC lens array and LCD combination 2 are not vertically positioned. However, it is also possible to set the transflective film and the angle relationship between the LC lens array and LCD combination 1 and the LC lens array and LCD combination 2, and the distance between the LC lens array and LCD combination 1 and the LC lens array and LCD combination 2, the images of the LC lens array and LCD combination 2 can be after the images of the LC lens array and LCD combination 1.

In the above embodiments of FIGS. 5 to 7, the two combinations (the LC lens array and LCD combination 1 and the LC lens array and LCD combination 2) are separated in space using a half mirror, and the LC lens array and LCD combination 2 and the two virtual images which are formed by the combination 2 do not go through the LC lens array and LCD combination 1 on the optical path, so that the two combinations do not interfere with each other and crosstalk can be reduced.

The angle between the transflective film and the combinations 1 and 2 may vary as the angle between the combination 1 and the combination 2 is changed, as long as the real images and the virtual images generated by the combination 1 and the combination 2 can be parallel.

It should be noted that although the focal lengths of the liquid crystal lens arrays in the imaging modules are equidifferent in the above embodiments of FIGS. 2 to 7, in other embodiments, the focal lengths of the liquid crystal lens arrays in the imaging modules may not be equidifferent.

Those skilled in the art will readily recognize other embodiments of the present disclosure upon consideration of the specification and practice of the disclosure disclosed herein. This application is intended to cover any variations, uses, or adaptations of the present disclosure which follow the general principles of the present disclosure and include any common knowledge or conventional techniques in this technical field which are not disclosed by the present disclosure. The description and embodiments should be considered as exemplary only, and the true scope of the disclosure is defined by the appended claims.

What is claimed is:

1. A light field display device, comprising a plurality of imaging modules, the plurality of imaging modules comprising a plurality of liquid crystal lens arrays and a plurality of display screens, wherein each of the imaging modules comprises a liquid crystal lens array and a display screen, the number of the plurality of imaging modules is equal to the number of the plurality of liquid crystal lens, the number of the plurality of imaging modules is equal to the number of the plurality of display screens, the liquid crystal lens array is disposed on a light exit side of the display screen, and images of the plurality of imaging modules are parallel to each other.

2. The light field display device according to claim 1, wherein the plurality of imaging modules comprise a first imaging module and a second imaging module which are disposed in parallel.

3. The light field display device according to claim 1, wherein the plurality of imaging modules comprise a first imaging module and a second imaging module which are disposed in a preset angle.

4. The light field display device according to claim 3, further comprising a transflective film, wherein:
the transflective film is used to make images of the first imaging module and images of the second imaging module parallel to each other.

5. The light field display device according to claim 4, wherein the first imaging module and the second imaging module are vertically disposed, and the transflective film forms an angle of 45 degrees with the first imaging module and the second imaging module.

6. The light field display device of claim 4, wherein images of the first imaging module are formed before or after images of the second imaging module.

7. The light field display device according to claim 3, further comprising: a Polarization Beam Splitter (PBS) prism, wherein:
the PBS polarization beam splitter prism is used to make images of the first imaging module and images of the second imaging module parallel to each other.

8. The light field display device according to claim 2, wherein a first liquid crystal lens array of the first imaging module and a second liquid crystal lens array of the second imaging module have equal number of focal lengths.

9. The light field display device according to claim 2, wherein the number of focal lengths of a first liquid crystal lens array of the first imaging module is related to display performance of a first display screen of the first imaging module, the number of focal lengths of a second liquid crystal lens array of the second imaging module is related to display performance of second first display screen of the second imaging module, and the number of the focal lengths of the first liquid crystal lens array and the number of the second liquid crystal lens array are related to the number of depths of field of images to be displayed.

10. The light field display device of claim 1, wherein the liquid crystal lens array has a plurality of focal lengths which are equidifferent.

11. The light field display device according to claim 3, wherein a first liquid crystal lens array of the first imaging module and a second liquid crystal lens array of the second imaging module have equal number of focal lengths.

12. The light field display device according to claim 4, wherein a first liquid crystal lens array of the first imaging module and a second liquid crystal lens array of the second imaging module have equal number of focal lengths.

13. The light field display device according to claim 5, wherein a first liquid crystal lens array of the first imaging module and a second liquid crystal lens array of the second imaging module have equal number of focal lengths.

14. The light field display device according to claim 6, wherein a first liquid crystal lens array of the first imaging module and a second liquid crystal lens array of the second imaging module have equal number of focal lengths.

15. The light field display device according to claim 7, wherein a first liquid crystal lens array of the first imaging module and a second liquid crystal lens array of the second imaging module have equal number of focal lengths.

16. The light field display device according to claim 3, wherein the number of focal lengths of a first liquid crystal lens array of the first imaging module is related to display performance of a first display screen of the first imaging module, the number of focal lengths of a second liquid crystal lens array of the second imaging module is related to display performance of second first display screen of the second imaging module, and the number of the focal lengths of the first liquid crystal lens array and the number of the second liquid crystal lens array are related to the number of depths of field of images to be displayed.

17. The light field display device according to claim 4, wherein the number of focal lengths of a first liquid crystal lens array of the first imaging module is related to display performance of a first display screen of the first imaging module, the number of focal lengths of a second liquid crystal lens array of the second imaging module is related to display performance of second first display screen of the second imaging module, and the number of the focal lengths of the first liquid crystal lens array and the number of the second liquid crystal lens array are related to the number of depths of field of images to be displayed.

18. The light field display device according to claim 5, wherein the number of focal lengths of a first liquid crystal lens array of the first imaging module is related to display performance of a first display screen of the first imaging module, the number of focal lengths of a second liquid crystal lens array of the second imaging module is related to display performance of second first display screen of the second imaging module, and the number of the focal lengths of the first liquid crystal lens array and the number of the second liquid crystal lens array are related to the number of depths of field of images to be displayed.

19. The light field display device according to claim 6, wherein the number of focal lengths of a first liquid crystal lens array of the first imaging module is related to display performance of a first display screen of the first imaging module, the number of focal lengths of a second liquid crystal lens array of the second imaging module is related to display performance of second first display screen of the second imaging module, and the number of the focal lengths of the first liquid crystal lens array and the number of the second liquid crystal lens array are related to the number of depths of field of images to be displayed.

20. The light field display device according to claim 14, wherein the sum of the number of the focal lengths of the first liquid crystal lens array and the number of the second liquid crystal lens array is smaller than the number of depths of field of images to be displayed.

\* \* \* \* \*